May 6, 1958  E. DAWSON  2,833,878
ACCELERATION RESPONSIVE SWITCH
Filed June 13, 1956  2 Sheets-Sheet 1

EDWARD DAWSON
*INVENTOR.*

BY
ATTORNEYS.

May 6, 1958 E. DAWSON 2,833,878
ACCELERATION RESPONSIVE SWITCH
Filed June 13, 1956 2 Sheets-Sheet 2

EDWARD DAWSON
INVENTOR.

BY
ATTORNEYS.

United States Patent Office

2,833,878
Patented May 6, 1958

2,833,878

ACCELERATION RESPONSIVE SWITCH

Edward Dawson, State College, Pa., assignor, by mesne assignments, to the United States of America as represented by the Secretary of the Navy Application June 13, 1956, Serial No. 591,256

13 Claims. (Cl. 200—61.5)

My invention relates to acceleration responsive electric switches and, more particularly, to acceleration responsive switches for inclusion in an electrical circuit in a torpedo. As used herein "acceleration" is to be understood as being used in a vectorial sense and having either a positive or a negative value, thus including what is commonly understood to be acceleration and deceleration.

Acceleration responsive switches, or as they are more commonly known in the art, inertia responsive switches as such are well known, but usually such switches are complicated and friction or the like present therein seriously effects the reliability of such switches.

In torpedoes launched from fixed wing aircraft, it is extremely important that the torpedo be activated and armed in every instance at or immediately after water entry, but that such not occur as a result of a catapult takeoff, arrested landing or barrier crash of the aircraft aboard ship.

Since the angle of water entry of an airdropped torpedo cannot be accurately predicted in every instance, it is equally important that the acceleration responsive switch perform its intended operation regardless of the direction of the force applied to the acceleration responsive part of the switch. It is, accordingly, an object of my invention to provide a reliable acceleration responsive switch that will perform its intended operation regardless of the direction of the force applied to the inertia responsive part or parts of the switch.

Another object of my invention is the provision of an acceleration responsive switch wherein the effects of friction are reduced to a minimum.

A further object of my invention is the provision of an acceleration responsive switch that may be adjusted to be actuated by forces of different magnitude and wherein the sensitivity is adjustable.

A still further object of my invention is the provision of a reliable switch that may be responsive to one mechanical shock in any plane and is thereafter unresponsive and must be manually re-set.

Another object of my invention is the provision of an acceleration responsive switch having a sharply defined operating range.

A still further object of my invention is the provision of a more dependable acceleration responsive switch.

A still further object of my invention is the provision of a dependable acceleration responsive switch having a response to a specific disturbance that is variable and that may be accurately set.

These and other objects and features of the invention, together with their incident advantages, will be more readily understood and appreciated from the following detailed description of the preferred embodiment thereof selected for purposes of illustration and shown in the accompanying drawings, in which.

Figure 2:
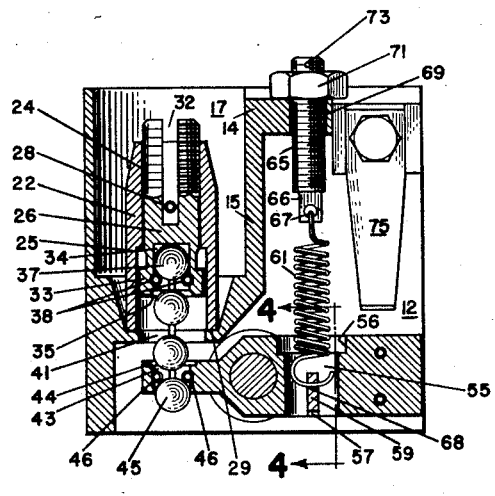
Figure 2 is a sectional side view of my invention.

In accordance with my invention I employ a housing having contained therein an upstanding cylindrical weight having a flat lower surface and tiltably seated in a socket having conical side walls and a relatively large opening in its lower surface, the lower end of the cylindrical weight being connected through this opening to one end of a pivoted lever by a ball chain or the like. The tiltable weight is comprised of an outer element and an inner element in threaded engagement, the upper end of the ball chain being circumferentially pivoted in the inner element and the lower end of the ball chain being circumferentailly pivoted in the forward end of the lever, as for example as shown in Figure 2. One end of a suitable spring is adjustably connected to the housing and the other end is connected to the lever rearwardly of its pivot point with regard to the ball chain. Two downwardly extending flexible electric switch members forming part of an electrical switch are provided directly above the rearward end of the lever and may be adapted such that unless one is restrained, its lower portion will be in contact with the lower portion of the other switch member. An upstanding sear composed of a suitable insulating material is mounted in the rear portion and adapted to hold one switch member in a specific position, as for example in insulated and spaced relation with the regard to the other switch member, until actuation of the switch by rotation of the lever. Utilization of my ball chain connection, ball bearing pivots, and minimum contact between the sear and one switch member commensurate with the circumstances under which the switch will be used insures a minimum and constant amount of friction and hence increased dependability of the switch. The adjustable features of the weight and the spring allow compensation for errors in tolerance, manufacture, variations in spring tension, the amount of contact between the sear and the restrained switch member which is the major source of friction in the system, and accurate and permanent adjustment of the amount of inertia force necessary to actuate the switch.

Figure 1:
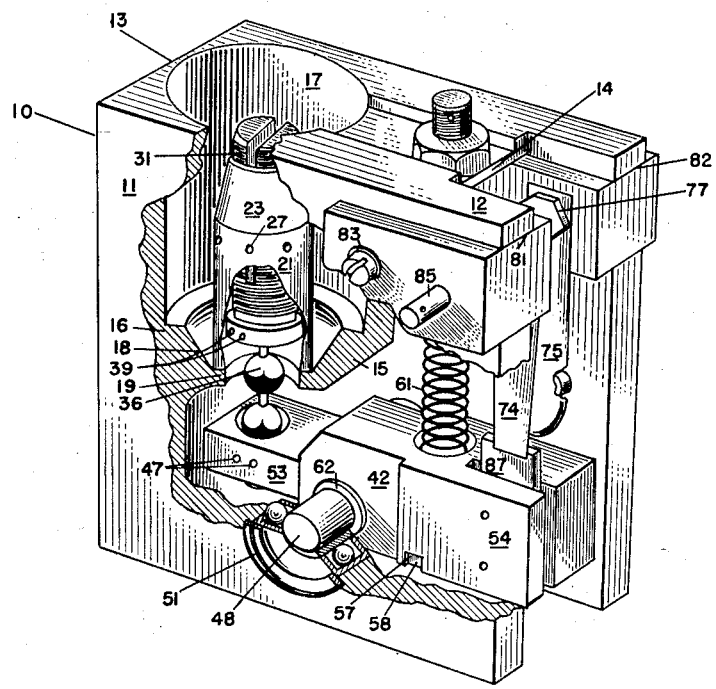
Figure 1 is a perspective view of the preferred embodiment of my invention having parts in section and fragments broken away for convenience of illustration.
Figure 3:
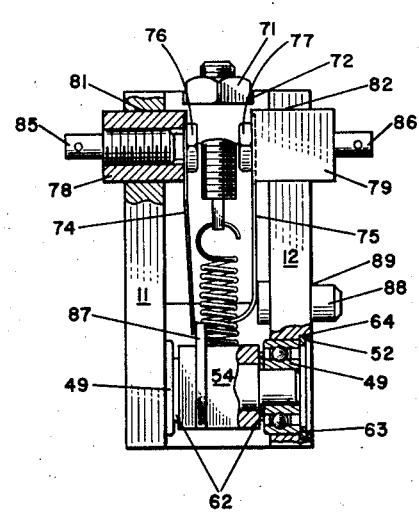
Figure 3 is an end view of my invention showing more clearly the electrical contacts and having fragments broken away for convenience of illustration.

As shown in Figure 1, Figure 2, and Figure 3, the reference numeral 10 indicates a substantially rectangular case having side walls 11—12, a front wall 13, a horizontal transverse top portion 14 having a longitudinal groove 72 in its upper surface, a vertical transverse center wall 15 integral with top portion 14, and a seat portion 16, said center wall 15, side walls 11—12, front wall 13 and seat 16 being adapted to form a vertical cylindrical recess 17 the upper end of which is open and the lower end of which is partially closed by seat portion 16 as shown in Figure 2. Seat 16 is formed by a conical recess 18 having its greatest and upper diameter less than that of recess 17 and an inwardly protruding flat ring 19 integral with the lower portion of seat 16 and adapted to receive the lower end of inertia member 21 as shown in Figure 2. Proper proportioning of conical recess 18 and ring 19 will insure that inertia member 21 is accurately and freely guided or returned to its normal position and location. The height of conical recess 18 should be greater than the maximum amount of vertical movement of inertia member 21 and its degree of taper should be greater than the angle of tilt of inertia weight 21 necessary to actuate the switch mechanism as will be more fully explained hereinafter. The internal diameter of recess 17 should be of such a value that inertia weight 21 may freely tilt through the desired angle. If inertia weight 21 and seat 16 are associated and formed in the manner described hereinabove the response of inertia weight 21 to various inertia forces will remain substantially the same.

The tiltable inertia weight 21 is preferably comprised of a hollow cylindrical outer element 22 having a tapered upper outer portion 23 to allow a reduction in the necessary diameter of recess 17 and a lower surface 29 perpendicular to the longitudinal axis of weight 21, an internally threaded upper surface 24 and an unthreaded inner lower surface 25, the lower inner surface 25 having a diameter greater than the threaded upper surface 24 to slidably receive lower portion 33. Holes 27 are provided in outer element 22, such as for example by drilling three holes completely through outer element 22, to receive a removable locking pin 28 for locking inner element 26 as will be more fully explained later herein. Lower surface 29 and the upper surface of ring 19 should be perpendicular to the longitudinal axis of weight 21 and of such finish and diameter as to provide good mating surfaces and prevent lateral movement of inertia weight 21. Inner element 26 is provided with external threads 31 adapted to mate with internally threaded surface 24, a longitudinal slot 32 in its upper end, and a lower portion 33 adapted to slidably mate with surface 25 thus providing a guide to insure the proper positioning of element 26. However, if desired, the entire inner surface of outer element 22 and the entire outer surface of inner element 26 may be adapted for threaded engagement. As is most clearly shown in Figure 2, an upwardly extending recess 34 having an outwardly tapered lower surface 35 for clearance is provided in the lower surface of inner element 26 and adapted to freely receive ball 37 of ball chain 36. Ball 37 in the absence of tension, is freely held in recess 34 by means of two removable locking pins 38 mounted in holes 39 transverse of element 26.

Figure 5:
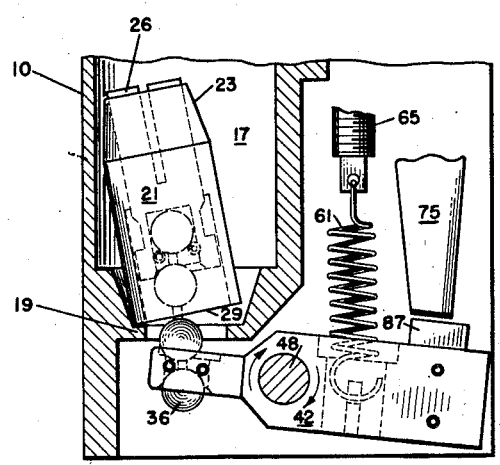
Figure 5 is a partial side view of the switch actuating mechanism in an actuated position.

Extending downwardly through a concentric opening 41 having a diameter slightly less than that of inertia weight 21 is a ball chain 36 attached to the forward end 53 of lever arm 42 along its longitudinal axis as shown in Figure 1. A concentric passage 43 having a counterbored upper portion 44 for clearance as shown in Figure 5, is formed in the forward portion 53 of lever arm 42 and adapted to freely receive ball 45 of ball chain 36. Removable locking pins 46 similar to locking pins 38 are mounted in transverse holes 47. Holes 39—47 and locking pins 38—46 are so adapted and located that a portion of each set of locking pins passes respectively through recess 34 and passage 43 such that ball 37 is restrained by tangential contact from moving in a downward direction and ball 45 is similarly restrained from moving in an upward direction.

Although I have found that the use of a ball type chain connection and the method described hereinabove for attaching the chain to the inertia weight and the lever arm are far superior to any other type of connection in that friction and undesirable moments affecting the action of inertia member 21 have been substantially reduced to a minimum, it is to be understood that other means, although less desirable, will occur to those experienced in the art and may be utilized, such as for example, a sufficiently strong thin wire or the like or a ball-ended solid connecting rod.

It may now be obvious that inertia member 21, unless restrained, may freely tilt in any direction or move in an upwardly direction. It may now also be further obvious that due to the flexibility, strength and compressibility of ball chain 36 and the fact that balls 37—45 are substantially free to move due to the existence of only tangential contact friction with their respective locking pins, that frictional forces and undesirable moments tending to restrain movement or tilting of inertia member 21 have been substantially reduced.

Figure 4:
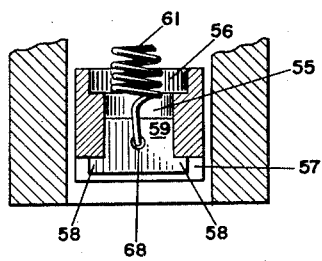
Figure 4 is a sectional end view taken along line 4—4 of Figure 2.

Lever arm 42 is mounted intermediate of its ends on a shaft 48 which is journaled in ball bearings 49 as at 51—52 in walls 11—12 to reduce friction. In its normal position lever arm 42 should be substantially in perpendicular alignment with the longitudinal axis of inertia weight 21 to reduce as much as possible undesirable moments and frictional forces. Lever arm 42 may be substantially rectangular in shape having a reduced forward portion 53 with a mass substantially less than that of its rear portion 54 for purposes as will be more fully explained later herein. Lever arm 42 is provided with a vertical passage 55 located rearwardly of shaft 48 to freely receive spring 61, a counterbored upper portion 56 being provided to allow clearance for spring 61 as shown in Figure 5. As is more clearly shown in Figure 4, a transverse slot 57 centrally located with respect to passage 55 is provided to receive ears 58 of the inverted T-shaped element 59 adapted for removable connection to spring 61 as by hole 68. As previously stated, lever arm 42 is mounted intermediate of its ends on shaft 48 which in turn is journaled in roller bearings 49. In order to hold lever arm 42 in fixed relation with the roller bearings 49, spacers 62 are provided therebetween. Retaining rings 63 removably adapted to fit in grooves 64 provide the means whereby the roller bearings are held from transverse movement and hence also fix the position of lever arm 42, the longitudinal axis of which should, as mentioned previously, be in a plane perpendicular to and coincident with the longitudinal axis of inertia member 21.

Disposed intermediate element 59 and threaded member 65 and connected thereto as by hole 68 and ear 66 having a similar hole 67, is a spring 61. In order to prevent the existence of undesirable moments on lever arm 42 and to facilitate the operation of lever arm 42, it is desirable that hole 68 be located on the longitudinal axis of lever arm 42. In order to allow adjustment of the tension exerted by spring 61 and consequently the amount of inertia force necessary to cause actuation of inertia weight 21, threaded element 65 extends upwardly through passage 69 and has provided on its upper end an internally threaded nut 71 of such size and shape as to non-rotatably fit in slot 72. A passage 73 is provided in the extreme upper end of element 69 to receive a suitable rod or the like whereby threaded element 65 and nut 71 may be raised against the tension of spring 61 and the position of nut 71 with respect to element 65 varied thus increasing or diminishing the restraining force exerted on inertia weight 21 through lever arm 42 and ball chain 36 by spring 61. Since slot 72 is of such a width as to just receive nut 71 and the tension of spring 61 holds nut 71 firmly in slot 72, it may now be obvious that when the position of nut 71 and hence the desired force exerted on lever arm 42 by spring 61 is secured, such will not be subject to variations by reason of vibration or the like.

For the case where it is desired to complete an electrical circuit by actuation of the switch, switch members 74—75 are mounted above the rear portion 54 of lever arm 42 and are rigidly secured respectively to pins 76—77 which may be rigidly mounted in any suitable manner respectively in insulating members 78—79, as shown in Figure 3, said insulating members being fixed in any suitable manner to walls 11—12 such as for example by slots 81—82 and screws 83. Pins 76—77 respectively terminate in ears 85—86 adapted for connection to an electrical circuit. Switch members 74—75 are preferably relatively long, flexible elements composed of beryllium-copper or the like, switch member 74 being substantially straight, the lower portion thereof being adapted, such as for example by bending, to be in contact with switch member 75 when unrestrained. The lower portion of switch member 75 is curved inwardly toward switch member 74 whereby when switch member 74 is unrestrained by the insulating sear 87 vertically mounted in the rear portion 54 of the lever arm, it will spring toward and make contact with switch member 75. A re-set button 88 composed of a suitable insulating material is slidably mounted in wall 12 as at 89, and is comprised of an enlarged inner portion and an outwardly extending finger portion, said enlarged inner portion holding contact 75 in fixed spaced relation from wall 12. Switch member 75 thus bears on the inner enlarged portion of re-set button 88 holding it in intimate contact with the inner surface of wall 12 whereby the re-set button is prevented from transverse movement due to vibration and the like. Further, in this way switch member 75 is additionally prevented from transverse movement by action of switch member 74 upon actuation of the switch thus insuring a good electrical connection between switch members 74—75.

The angular position of lever arm 42, and hence the tilt angle of the inertia weight at which the switch operates, may be easily adjusted by varying the position of the inner threaded element 26 with respect to the outer element 22 of the inertia weight. When the desired tilt angle has been secured, the inner element 26 and the outer element 22 may be securely locked with relation to each other by inserting a locking pin 28 through slot 32 and two of the holes 27 nearest the location of slot 32, the amount of adjustment of the position of slot 32 being substantially dependent on the number of holes in the outer element 22. After selection of a desired tilt angle, the inner element 26 should be adjusted such that a clearance of about .02 inch is provided between switch member 74 and sear 87 when the inertia member 21 is fully tilted.

The tension of spring 61 may be easily adjusted by either subjecting the entire assembly to accelerations of known magnitude on a rotating table and varying spring tension in the manner described previously herein until the switch operates, or alternately, by mathematically converting spring tension, in terms of switch parameters, to acceleration and adjusting the tension of spring 61 to the desired amount.

My switch may be mounted in substantially any position without seriously affecting its operation or reliability. However, for the simplest application of my switch, if the direction of the actuating inertia force is known or approximately known the switch should be mounted such that the inertia weight is approximately perpendicular to the plane in which the inertia force is expected to lie.

For the simple case of acceleration or deceleration in a plane perpendicular to the longitudinal axis of the inertia weight 21 sufficient to overcome the force exerted by spring 61, inertia weight 21 will tilt about the outer periphery of surface 29 in conformance with the laws of motion thereby causing the lever arm 42 to rotate as shown and indicated in Figure 5. The angle of tilt necessary to actuate the switch is dependent on the amount of contact between sear 87 and switch member 74 which should preferably be substantially coplanar. Upon sufficient rotation of lever arm 42, as shown in Figure 5, sear 87 will release switch member 74 thus allowing its lower end to move into electrical contact with switch member 75 as previously described. Subsequent decrease of the acceleration or deceleration allows spring 61 to become the controlling force and move lever arm 42 back to its normal position, thus causing inertia weight 21 to resume its normal position.

When the switch is used for exercise runs, switch member 74 may be re-set manually by rotating the lever arm 42 in a clockwise direction as shown in Figure 5 until sear 87 clears switch member 74, depressing the re-set button 88 until switch member 74 is returned to a point past its normal unactuated position and releasing lever arm 42 and re-set button 88 so that sear 87 engages and retains switch member 74 away from switch member 75.

In view of the above it may now be obvious that if switch member 74 is adapted to be spaced away from switch member 75 in an actuated position and sear 87 is so adapted and located so to maintain switch member 74 in contact with switch member 75 in an unactuated condition, upon actuation of the switch an electrical circuit may be broken instead of completed as for example when it is desired to prevent a torpedo or the like from reattacking once it has struck a target. In order to re-set the switch it is only necessary to mount the re-set button 88 in wall 11 in a position and manner similar to that described hereinabove whereby upon depression of the re-set button, switch member 74 may be moved into contact with switch member 75.

For acceleration or deceleration in any plane other than a plane perpendicular to the longitudinal axis of the inertia weight as shown in Figure 3 the effects of the inertia weight 21 and the rear portion 54 of lever arm 42 are combined. For deceleration in a downward direction and acceleration in an upward direction with reference to Figure 2, the inertia weight 21 does not tilt, but the rear portion 54 rotates about shaft 48 in conformance with the laws of motion thus actuating the switch. By properly proportioning the mass of inertia weight 21 and the mass of rear portion 54 and the distance of the center of gravity of rear portion 54 from the longitudinal axis of shaft 48, the operational characteristics of the switch may be varied within wide limits.

While I have shown a particular embodiment of my invention, I am aware that many minor changes therein will readily suggest themselves to others skilled in the art without departing from the spirit and scope of the invention. It is to be understood, therefore, that I do not wish to be limited to the particular showings made, but wish to be limited by the scope of the claims hereto appended.

I claim:

1. In an acceleration responsive switch the combination comprising: a housing structure; an inertia member having a flat lower surface; a seat portion connected to said housing structure, said seat portion having formed therein a downwardly and inwardly extending recess and an inwardly protruding surface formed at the smaller end of said recess adapted to receive said flat lower surface and support said inertia member, said inwardly protruding surface having an opening in alignment with said inertia member; a lever arm having a front portion and a rear portion and pivotally mounted intermediate of its ends in said housing structure, said front portion being substantially in perpendicular alignment with said inertia member; means connecting said inertia member and the front portion of said lever arm whereby said inertia member may tilt in any direction, and said front portion in its normal position is restrained from moving away from said inertia member; means associated with said housing structure and said lever arm whereby said lever arm and said connecting means are urged in such a direction as to oppose tilting of said inertia member; and an electrical switch mechanism operationally associated with said lever arm whereby said switch mechanism is actuated by rotation of said lever arm due to acceleration of said housing structure.

2. In an acceleration responsive switch the combination comprising: a housing structure; an inertia member adapted to be tiltably supported in said housing structure, said inertia member having a substantially flat cylindrical surface; a seat adapted to support said inertia member, said seat being provided with a recessed surface adapted to mate with said inertia member flat surface whereby said inertia member may tilt about the periphery of said flat surface; a lever arm having a front portion and a rear portion and pivotally mounted intermediate of its ends in said housing structure, said rear portion having a mass substantially greater than the mass of said front portion, said front portion being substantially in perpendicular alignment with said inertia member; means connecting said inertia member and the front portion of said lever arm whereby said inertia member may tilt in any direction and said front portion in its normal position is restrained from moving away from said inertia member, said means comprising a first arcuate end portion disposed in said inertia member and restrained from movement toward said lever arm by two points of tangential contact and a second arcuate end portion disposed in said front portion of said lever arm and restrained from movement toward said inertia member by two points of tangential contact; means associated with said housing structure and said lever arm whereby said lever arm and said connecting means are urged in such a direction as to oppose tilting of said inertia member; and an electrical switch mechanism operationally associated with said lever arm whereby said switch mechanism is actuated by rotation of said lever arm due to acceleration of said housing structure.

3. In an acceleration responsive switch the combination comprising: a housing structure; a cylindrical inertia member tiltably mounted in said housing structure, said inertia member comprising a first element adjustably associated with a second element, said second element having two end portions and a flat lower surface, and means to fix the location of said first element with respect to said second element; a seat portion connected to said housing structure, said seat portion having formed therein a downwardly and inwardly extending recess and an inwardly protruding surface formed at the smaller end of said recess adapted to receive said lower surface and support said inertia member, said inwardly protruding surface having an opening in alignment with said inertia member; said opening having a diameter slightly less than that of said cylindrical inertia member; a lever arm having a front portion and a rear portion and pivotally mounted intermediate of its ends in said housing structure, said front portion being substantially in perpendicular alignment with said inertia member; means connecting one end of said second element and the front portion of said lever arm whereby said inertia member may tilt in any direction and said front portion in its normal position is restrained from moving away from said inertia member; means associated with said housing structure and said lever arm whereby said lever arm and said connecting means are urged in such a direction as to oppose tilting of said inertia member; and an electrical switch mechanism operationally associated with said lever arm whereby said switch mechanism is actuated by rotation of said lever arm due to acceleration of said housing structure.

4. In an acceleration responsive switch the combination comprising: a housing structure; a cylindrical inertia member tiltably mounted in said housing structure, said inertia member comprising a first element adjustably associated with a second element, said second element having two end portions, and means to fix the location of said first element with respect to said second element; a lever arm having a front portion and a rear portion and pivotally mounted intermediate of its ends in said housing structure, said front portion being substantially in perpendicular alignment with said inertia member; means connecting one end of said second element and the front portion of said lever arm whereby said inertia member may tilt in any direction and said front portion in its normal position is restrained from moving away from said inertia member, said means comprising a connecting element having a circumferentially pivoted connection with said inertia member and said front portion of said lever arm; means associated with said housing structure and said lever arm whereby said lever arm and said connecting means are urged in such a direction as to oppose tilting of said inertia member; and an electrical switch mechanism operationally associated with said lever arm whereby said switch mechanism is actuated by rotation of said lever arm due to acceleration of said housing structure.

5. In an acceleration responsive switch the combination comprising: a housing structure; a cylindrical inertia member tiltably mounted in said housing structure, said inertia member comprising a first element adjustably associated with a second element, said second element having two end portions and a flat lower surface, and means to fix the location of said first element with respect to said second element; a seat portion connected to said housing structure, said seat portion having formed therein a downwardly and inwardly extending recess and an inwardly protruding surface formed at the smaller end of said recess adapted to receive said lower surface and support said inertia member, said inwardly protruding surface having an opening in alignment with said inertia member, said opening having a diameter slightly less than that of said cylindrical inertia member; a lever arm having a front portion and a rear portion and pivotally mounted intermediate of its ends in said housing structure, said front portion being substantially in perpendicular alignment with said inertia member; means connecting one end of said second element and the front portion of said lever arm whereby said inertia member may tilt in any direction and said front portion in its normal position is restrained from moving away from said inertia member, said means comprising a first spheroid end portion freely mounted in said second element and restrained from movement toward said lever arm by two points of tangential contact and a second spheroid end portion mounted in said front portion of said lever arm and restrained from movement toward said second element by two points of tangential contact; means associated with said housing structure and said lever arm whereby said lever arm and said connecting means are urged in such a direction as to oppose tilting of said inertia member; and an electrical switch mechanism operationally associated with said lever arm whereby said switch mechanism is actuated by rotation of said lever arm due to acceleration of said housing structure.

6. In an acceleration responsive switch the combination comprising: a housing structure; a seat disposed in said housing structure and having a supporting surface; a tiltable inertia member having its mass disposed above said supporting surface and a flat end surface in engagement with said supporting surface; a lever arm operationally associated with said inertia member and having a front portion and a rear portion and pivotally mounted intermediate of its ends in said housing structure; means connecting said inertia member and the front portion of said lever arm whereby said inertia member may tilt in any direction; means associated with said housing structure and said lever arm whereby said lever arm and said connecting means are urged in such a direction as to oppose tilting of said inertia member; and an electrical switch mechanism operationally associated with said lever arm whereby said switch mechanism is actuated by rotation of said lever arm due to acceleration of said housing structure.

7. In an acceleration responsive switch the combination comprising: a housing structure; a tiltable inertia member disposed in said housing structure and having a flat end surface, the mass of said inertia member being substantially perpendicularly located above said flat end surface; a lever arm having a front portion and a rear portion and pivotally mounted intermediate of its ends in said housing structure, said front portion being substantially in perpendicular alignment with said inertia member; means connecting said inertia member and the front portion of said lever arm whereby said inertia member may tilt in any direction and said front portion in its normal position is restrained from moving away from said inertia member; means associated with said housing structure and said lever arm whereby said lever arm and said connecting means are urged in such a direction as to oppose tilting of said inertia member; a seat portion carried by said housing and having a flat supporting surface for receiving said inertia member flat end surface and for supporting said inertia member substantially entirely above said flat supporting surface, said means associated with said housing structure and said lever arm normally maintaining said inertia member end surface in abutting engagement with said seat supporting surface; and an electrical switch mechanism operationally associated with said lever arm whereby said switch mechanism is actuated by rotation of said lever arm due to acceleration of said housing structure.

8. In an acceleration responsive switch the combination comprising: a housing structure; a tiltable inertia member, said inertia member comprising a first element having a flat lower surface and adjustably associated with a second element, said second element having two end portions, and means to fix the location of said first element with respect to said second element; a seat portion, said seat portion having a central passage and a flat surface surrounding said passage for abutting engagement with said first element lower surface, said flat surface and said lower surface operationally locating the mass of said inertia member substantially concentric with said central passage and above said seat flat surface; a lever arm having a front portion and a rear portion and pivotally mounted intermediate of its ends in said housing structure, said front portion being substantially in perpendicular alignment with said inertia member; means connecting one end of said second element and the front portion of said lever arm whereby said inertia member may tilt in any direction and said front portion in its normal position is restrained from moving away from said inertia member; means associated with said housing structure and said lever arm whereby said lever arm and said connecting means are urged in such a direction as to oppose tilting of said inertia member; and an electrical switch mechanism operationally associated with said lever arm whereby said switch mechanism is actuated by rotation of said lever arm due to acceleration of said housing structure.

9. In an acceleration responsive switch the combination comprising: a housing structure; a seat having a flat supporting surface provided with a central passage; a tiltable inertia member having a flat end surface resting upon said seat supporting surface, the center of mass of said inertia member being disposed substantially perpendicularly above said seat supporting surface; inertia member positioning means for normally maintaining said inertia member end surface and said seat supporting surface in substantially fixed transverse relationship; a lever arm having a front portion and a rear portion and pivotally mounted intermediate of its ends in said housing structure, said front portion being substantially in perpendicular alignment with said inertia member; means connecting said inertia member and the front portion of said lever arm whereby said inertia member may tilt in any direction and said front portion in its normal position is restrained from moving away from said inertia member, said means comprising a connecting element having a circumferentially pivoted connection with said inertia member and said front portion of said lever arm; means associated with said housing structure and said lever arm whereby said lever arm and said connecting means are urged in such a direction as to oppose tilting of said inertia member; and an electrical switch mechanism operationally associated with said lever arm whereby said switch mechanism is actuated by rotation of said lever arm due to acceleration of said housing structure.

10. In an acceleration responsive switch the combination comprising: a housing structure; a tiltable inertia member having a substantially flat end surface; a seat having a substantially flat supporting surface for receiving and supporting said inertia element end surface and maintaining the center of mass of said inertia member above and normally in a substantially perpendicular position with regard to said supporting surface, said supporting surface being provided with a central passage; inertia member positioning means for causing said inertia member when actuated to tilt about the periphery of said end surface and to be returned to a substantially fixed position; a lever arm having a front portion and a rear portion and pivotally mounted intermediate of its ends in said housing structure, said front portion being substantially in perpendicular alignment with the longitudinal axis of said inertia member; means connecting said inertia member and the front portion of said lever arm whereby said inertia member may tilt in any direction and said front portion in its normal position is restrained from moving away from said inertia member; means associated with said housing structure and said lever arm whereby said lever arm and said connecting means are urged in such a direction as to oppose tilting of said inertia member; and an electrical switch mechanism comprising a first and second switch member adapted for connection to an electrical circuit, said second switch member being further adapted when unrestrained to assume a first position with regard to said first switch member, and means connected to the rear portion of said lever arm to restrain said second switch member in a second position with regard to said first switch member whereby when said lever arm is actuated said second switch member will assume said first position thereby resulting in operation of said switch mechanism.

11. In an acceleration responsive switch the combination comprising: a housing structure; a cylindrical inertia member tiltably mounted in said housing structure, said inertia member comprising a first element adapted to adjustably receive a second element, said first element having two end portions and a flat lower surface perpendicular to its longitudinal axis, and means to fix the location of said second element with respect to said first element; a seat having a recessed flat surface for receiving and supporting said first element flat surface, said inertia member being substantially perpendicular to and above said seat flat surface, said recessed surface causing said inertia member when actuated to tilt about the periphery of said first element flat surface; a lever arm having a front portion and a rear portion and pivotally mounted intermediate of its ends in said housing structure, said rear portion having a mass substantially greater than the mass of said front portion, said front portion being substantially in perpendicular alignment with said inertia member; means connecting said second element and the front portion of said lever arm whereby said inertia member may tilt in any direction and said front portion in its normal position is restrained from moving away from said inertia member; means associated with said housing structure and said lever arm whereby said lever arm and said connecting means are urged in such a direction as to oppose tilting of said inertia member; and an electrical switch mechanism operationally associated with said lever arm whereby said switch mechanism is actuated by rotation of said lever arm due to acceleration of said housing structure.

12. In an acceleration responsive switch the combination comprising: a housing structure; an inertia member adapted to be tiltably supported in said housing structure and provided with a substantially flat supporting surface; a seat adapted to support said inertia member, said seat being provided with a central passage and inertia member positioning means whereby said inertia member will be returnable to a fixed position and will tilt about the periphery of said supporting surface; a lever arm having a front portion and a rear portion and pivotally mounted intermediate of its ends in said housing structure, said front portion being substantially in perpendicular alignment with said inertia member; means connecting said inertia member and the front portion of said lever arm whereby said inertia member may tilt in any direction and said front portion in its normal position is restrained from moving away from said inertia member, said means comprising a connecting element having a circumferentially pivoted connection with said inertia member and said front portion of said lever arm, said circumferentially pivoted connections comprising a first spheroid end portion mounted in said inertia member and restrained from movement toward said lever arm by two points of tangential contact and a second spheroid end portion mounted in said front portion of said lever arm and restrained from movement toward said inertia member by two points of tangential contact; means associated with said housing structure and said lever arm whereby said lever arm and said connecting means are urged in such a direction as to oppose tilting of said inertia member; and an electrical switch mechanism operationally associated with said lever arm whereby said switch mechanism is actuated by rotation of said lever arm due to acceleration of said housing structure.

13. In an acceleration responsive switch the combination comprising: a housing structure; an inertia member adapted to be tiltably supported in said housing structure and provided with a substantially flat supporting surface; a seat adapted to support said inertia member, said seat being provided with a central passage and inertia member positioning means whereby said inertia member will be returnable to a fixed position and will tilt about the periphery of said supporting surface; a lever arm having a front portion and a rear portion and pivotally mounted intermediate of its ends in said housing structure, said front portion being substantially in perpendicular alignment with the longitudinal axis of said inertia member; means connecting said inertia member and the front portion of said lever arm whereby said inertia member may tilt in any direction and said front portion in its normal position is restrained from moving away from said inertia member; means associated with said housing structure and said lever arm whereby said lever arm and said connecting means are urged in such a direction as to oppose tilting of said inertia member; and an electrical switch mechanism comprising a first and second switch member adapted for connection to an electrical circuit, said second switch member being further adapted when unrestrained to assume a first position with regard to said first switch member, and means connected to the rear portion of said lever arm to restrain said second switch member in a second position with regard to said first switch member whereby when said lever arm is actuated said second switch member will assume said first position thereby resulting in operation of said switch mechanism, and a re-set button slidably mounted in said housing structure and having an outer portion and an inner portion, said inner portion being adapted for contact with one of said switch members whereby said second switch member may be caused to substantially assume its first position.

References Cited in the file of this patent

UNITED STATES PATENTS

| | | |
|---|---|---|
| 2,130,706 | Salmond | Sept. 20, 1938 |
| 2,351,607 | Grant et al. | June 20, 1944 |